United States Patent [19]

Wilder

[11] Patent Number: 5,501,634

[45] Date of Patent: Mar. 26, 1996

[54] AIR CONDITIONER COVER ASSEMBLY

[76] Inventor: Timothy S. Wilder, 5237 SW. 120th Ave., Cooper City, Fla. 33330

[21] Appl. No.: 332,339

[22] Filed: Oct. 31, 1994

[51] Int. Cl.⁶ .................................................. B60H 1/32
[52] U.S. Cl. .................... 454/136; 454/109; 454/112; 454/140; 454/236
[58] Field of Search .......................... 454/99, 100, 109, 454/112, 136, 137, 139, 140, 315, 234, 236; 165/42

[56]        References Cited

U.S. PATENT DOCUMENTS

| | | | |
|---|---|---|---|
| 2,053,393 | 9/1936 | Clarkson | 454/112 X |
| 3,145,642 | 8/1964 | Radcliff | 454/315 X |
| 3,680,468 | 8/1972 | Schueler | 454/136 X |
| 3,727,537 | 4/1973 | Harty, Jr. | 454/230 |
| 3,867,486 | 2/1975 | Hagele | 454/136 X |
| 4,189,987 | 2/1980 | Amberg et al. | 454/139 X |
| 4,641,502 | 2/1987 | Aldrich et al. | 454/136 X |
| 4,672,818 | 6/1987 | Roth . | |
| 4,945,977 | 8/1990 | D'Agaro . | |
| 4,947,657 | 8/1990 | Kalmbach . | |
| 5,046,327 | 9/1991 | Walker et al. . | |

FOREIGN PATENT DOCUMENTS

| | | | |
|---|---|---|---|
| 3411053 | 10/1985 | Germany | 454/137 |
| 79010 | 6/1981 | Japan | 454/139 |
| 108063 | 4/1992 | Japan | 454/99 |
| 4-189670 | 7/1992 | Japan . | |

Primary Examiner—Harold Joyce
Attorney, Agent, or Firm—Malin, Haley, DiMaggio & Crosby

[57]              ABSTRACT

A cover assembly for a roof mounted air conditioner unit which allows an increased output air volume to flow from a roof mounted air conditioner into a cooling volume; the assembly comprises a cover, return air grills, side diffuser assemblies, and a register having frame, directional control louvers, volume control louvers, a throttle and mounting screws; the register is substantially in alignment with the output blower of a roof mounted air conditioner and sized to allow a maximum output air volume to flow into the cooling volume. The register's volume control louvers and directional control louvers control the amount of air passing through the register and the direction of air flow respectively. Additionally, a method for retro-fitting existing covers with a register aligned with the output blower of a roof mounted air conditioner thereby producing the same effect of the improved cover assembly is shown.

8 Claims, 4 Drawing Sheets

AIR CONDITIONER COVER ASSEMBLY

BACKGROUND OF THE INVENTION

1. Field of the Invention

This invention relates generally to an improved apparatus for discharging cooled air from a mounted air conditioner, and, more particularly, to an improved cover assembly, as well as a method for retro-fitting existing covers, which permits a larger cool air volume to be discharged thereby increasing the efficiency of the air conditioner unit to which apparatus is attached.

2. Description of the Prior Art

It is well known in the prior art to mount auxiliary air conditioning systems on moving vehicles. Similarly, it is also well known to roof mount air conditioning units above small enclosed spaces such as toll booths and the like.

Ordinarily, vans and mobile homes with auxiliary air conditioning systems are provided with standard-sized rectangular interior mounted air conditioner cover assemblies. Similarly, toll booths and other small enclosed spaces that employ roof mounted air conditioners are provided with a standard internally mounted cover assembly. Typically, cover assemblies are mounted up against the ceiling of the interior space of the roof below the position where the air conditioner is attached. In turn, the cover directs the air conditioner blower's output to a plurality of small registers mounted vertically on each side of the outer lip of the cover assembly. However, this arrangement requires discharged air to flow from the blower which is centrally located within the unit to vertical registers which are in line with the outermost edges of the air conditioner. This indirect air path combined with small vertical registers deleteriously inhibits the air volume discharged from the blower thereby decreasing the output efficiency of the air conditioner. Subsequently, the air conditioner requires more time to cool the vehicle or enclosure to the desired temperature. Alternatively, the air conditioner must be set to a higher cooling setting to produce the desired effect. Furthermore, in southern geographic ares such as Arizona, California, Florida and Texas, even when the air conditioner is set to maximum output there is insufficient air flow to sufficiently cool the enclosed volume. Additionally, inadequate air flow is known to result in evaporator freeze up at low fan speeds and inadequate cooling performance. Attempts to remedy the deficiencies, as they relate to roof mounted air conditioners, have been directed toward streamlining these units as well as providing a more durable and accessible housing for the components of the air conditioner.

For example, U.S. Pat. No. 4,641,502, issued to Aldrich et al., discloses an improved roof mounted air conditioner for recreational vehicles (RV's) that is designed to be superposed over the standard 14" by 14" opening in the roof and ceiling of a RV. The invention, more particularly, is directed toward an air conditioner that has an equal size and weight of prior units but has a more aesthetically pleasing "low profile" aspect when mounted on the roof of a RV. Again however, this invention does not recognize or disclose the present invention of placing the register directly in line with the output blower.

Similarly, U.S. Pat. No. 4,495,977, issued to D'Agaro discloses an auxiliary air conditioning system for large motor vehicles. However, D'Agaro mounts his invention beneath the floor of a vehicle rather than the roof as done in Aldrich et al. After the air has been either heated or cooled it is fed back into the passenger compartment via a flexible duct which passes through a hole in the floor of the vehicle. D'Agaro discloses a duct that runs up approximately ¾ the height of the side wall of the vehicle where it then terminates in an undisclosed output means. Due to the floor mounting arrangement, D'Agaro requires an extensive duct system to transfer discharged air to an appropriate level where it can then be released into the passenger compartment. This duct system contributes to system pressure losses thereby decreasing the overall efficiency of the air conditioning system.

U.S. Pat. No. 4,672,818, issued to Roth, discloses a three member molded plastic housing for rooftop air conditioners, including a base member, intermediate member and an outer shroud member. In particular, the purpose of this invention is to provide easier access to the internal components of the air conditioner when the unit is being serviced as well as decrease the number of caulked joints. Generally, the three part apparatus eliminates the need for removing the entire unit from its roof top mount when the unit is being serviced. In turn, that decreases the service time normally required not only to re-caulk the joints which are broken when the shroud is removed to service the unit, but also the re-caulking of joints which have hardened and cracked in service.

In conclusion, while the prior art fails to provide for a device that allows the high output air volume of the present invention. As such, there is a present need for an improved air conditioner cover assembly that employs a register that is substantially in line with the output of the squirrel cage blower thus allowing for high output air volume and increased efficiency of the roof mounted air conditioner.

SUMMARY OF THE INVENTION

The present invention discloses an improved cover for use with roof mounted air conditioners and a method for retro-fitting existing covers to employ a register that is directly in line with the output of the squirrel cage blower of a roof mounted air conditioner. The improved cover allows for greater air flow thereby decreasing cooling time, even when the air conditioner is set to a lower fan setting.

The present invention comprises a cover assembly having a register which is substantially in direct alignment with the output lip of the roof mounted air conditioner's discharge blower. Where a short amount of duct work is employed to extend the blower past other air conditioner components, the register is in alignment with the lip of the extended duct work. The register provides a means for discharged air to escape, without diversion, into the area to be cooled. As a result of the alignment of the blower and register, there is minimal decrease in air speed and pressure of the discharged air thereby producing a substantially increased cooling output for a given fan setting.

Additionally, the register can be equipped with a means for controlling the air volume and direction. In particular, louvers that move between a horizontal and vertical position are used to control air volume. These volume control louvers are connected to a throttle whereby they can be moved from the horizontal, closed position, to the vertical, open position, and any position therebetween. Similarly, directional louvers are mounted perpendicular to, and in a plane beneath the volume control louvers and can be manually adjusted to deflect air flow in a desired direction.

Another aspect of this invention is the method by which existing covers can be retro-fitted, with the use of templates, to accommodate a register which is substantially in line with the output of a roof mounted air conditioner's blower. The templates have a cut out portion that is in line with the position the new register is to be placed. As employed, the template is aligned with the edges of an existing cover assembly. After alignment, the cut out portion is traced onto the existing cover assembly. In turn, any means for accurately and neatly cutting through plastic, such as a knife, blade, or saw is used to cut along the previously traced out shape. When the plastic has been cut and removed the new register supplied with the kit is inserted into the cut out hole. Finally, a means for mounting the register to the existing cover assembly is employed. Such means include, but are not limited to, screws, glue, tape, clips, and the like.

It is therefore a principal object of this invention to provide a novel cover assembly for roof mounted air conditioners that allows for a substantially increased cooling output for any given fan setting.

It is a further object of this invention to provide a novel method for retro-fitting existing roof mounted air conditioner cover assemblies that results in a substantially increased cooling output for any given fan setting.

In accordance with these and other objects which will become apparent hereinafter, the instant invention will now be described with particular reference to the accompanying drawings.

DESCRIPTION OF THE PREFERRED EMBODIMENT

Figure 1:
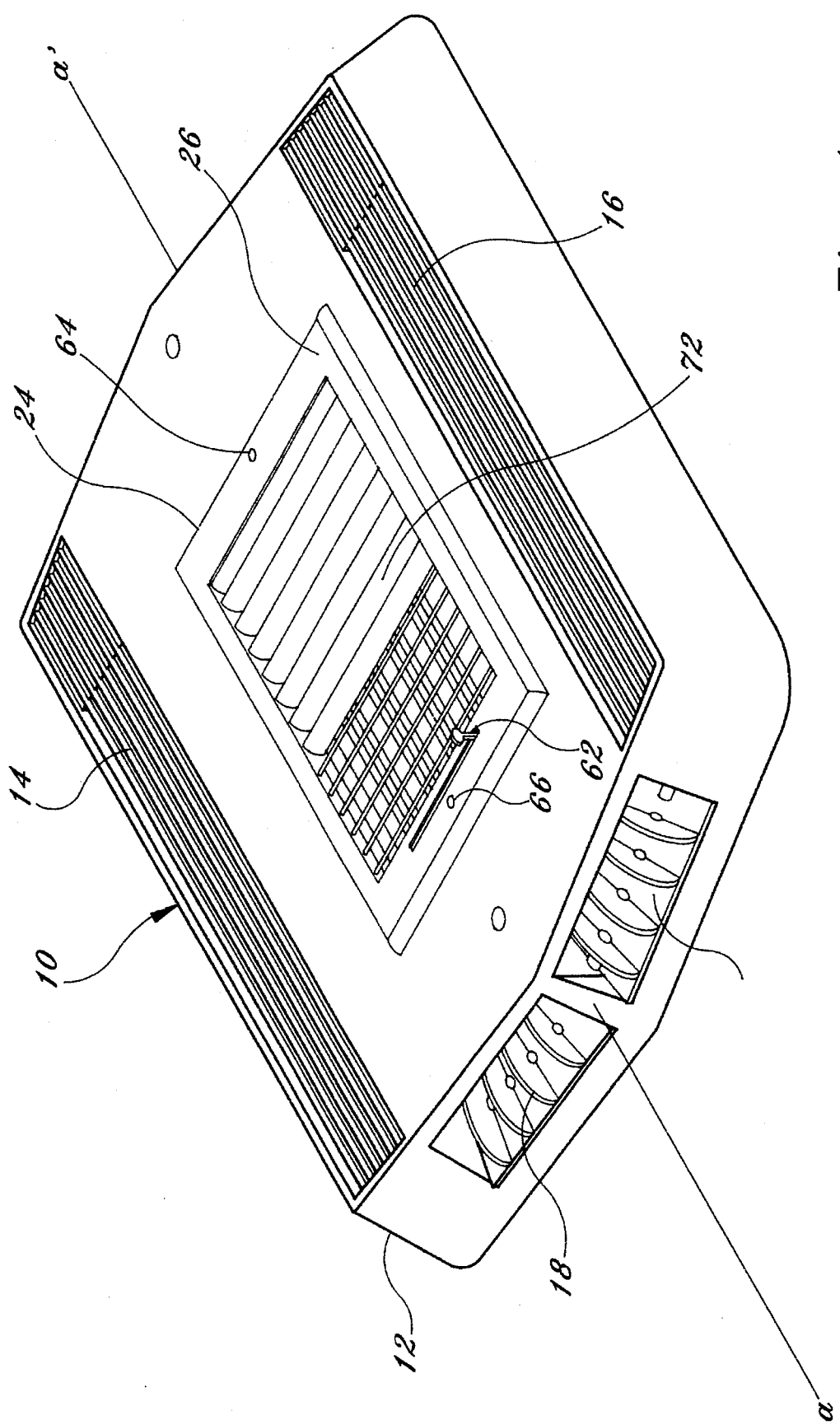
FIG. 1 is a perspective view of the improved cover assembly of the present invention.

With reference to FIGS. 1–4, there is depicted an improved cover assembly generally characterized by the reference numeral 10 which comprises a cover 12, return air grills 14 and 16, side diffuser assemblies 18, and a register assembly 24. Register assembly 24 comprises a frame 26, directional control louvers 28, volume control louvers 52, a throttle 62 and a mounting means. Preferably the mounting means are screws 64 and 66.

In the preferred embodiment, cover 12 is preferably substantially rectangular and large enough to cover the base of the roof mounted air conditioner's base. However, it is to be understood that cover 12 is not limited to a rectangular shape. Cover 12 is preferably screw mounted to the base of the roof mounted air conditioner. It is recognized that other means for mounting are available such as, clips, tape, glue and like fastening devices.

Return air grills 14 and 16 are disposed within cover 12 and are parallel to the elongate axis a—a' of said cover. The return air grills 14 and 16 provide a means for allowing a volume of air to be drawn into the roof mounted air conditioner unit (not shown).

A register assembly 24 is sealingly mounted to the face portion 13 of cover 12 along the frame 26 of said register assembly 24. In the preferred embodiment, the register assembly 24 is mounted to cover 12 via mounting screws 64 and 66. It is recognized however, that other means, including but not limited to, clips, glue, and like fastening devices can be used to mount register assembly 24 to cover 12.

Register assembly 24 is generally rectangular in shape and corresponds to the shape of the output of blower 68 of the roof mounted air conditioner. Register assembly 24 is further defined by a top surface 70, a bottom surface 72, and a plurality of side surfaces 74, 76, 78 and 80. The top and bottom surfaces 70 & 72 respectively generally define a frame 26 of register assembly 24. It is also recognized that the register assembly 24 can be other shapes, including but not limited to round, square or any other polygon, so long as it is not smaller than the output of the blower of the roof mounted air conditioner.

Figure 2:
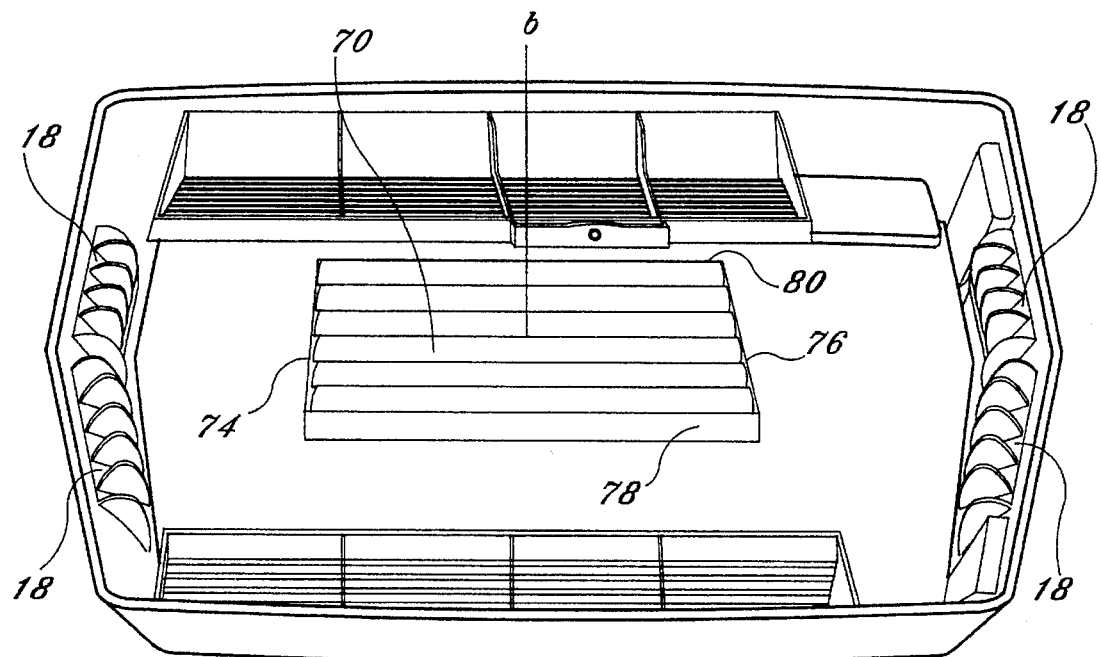
FIG. 2 is an interior plan view illustrating the back side of the present invention.
Figure 4:
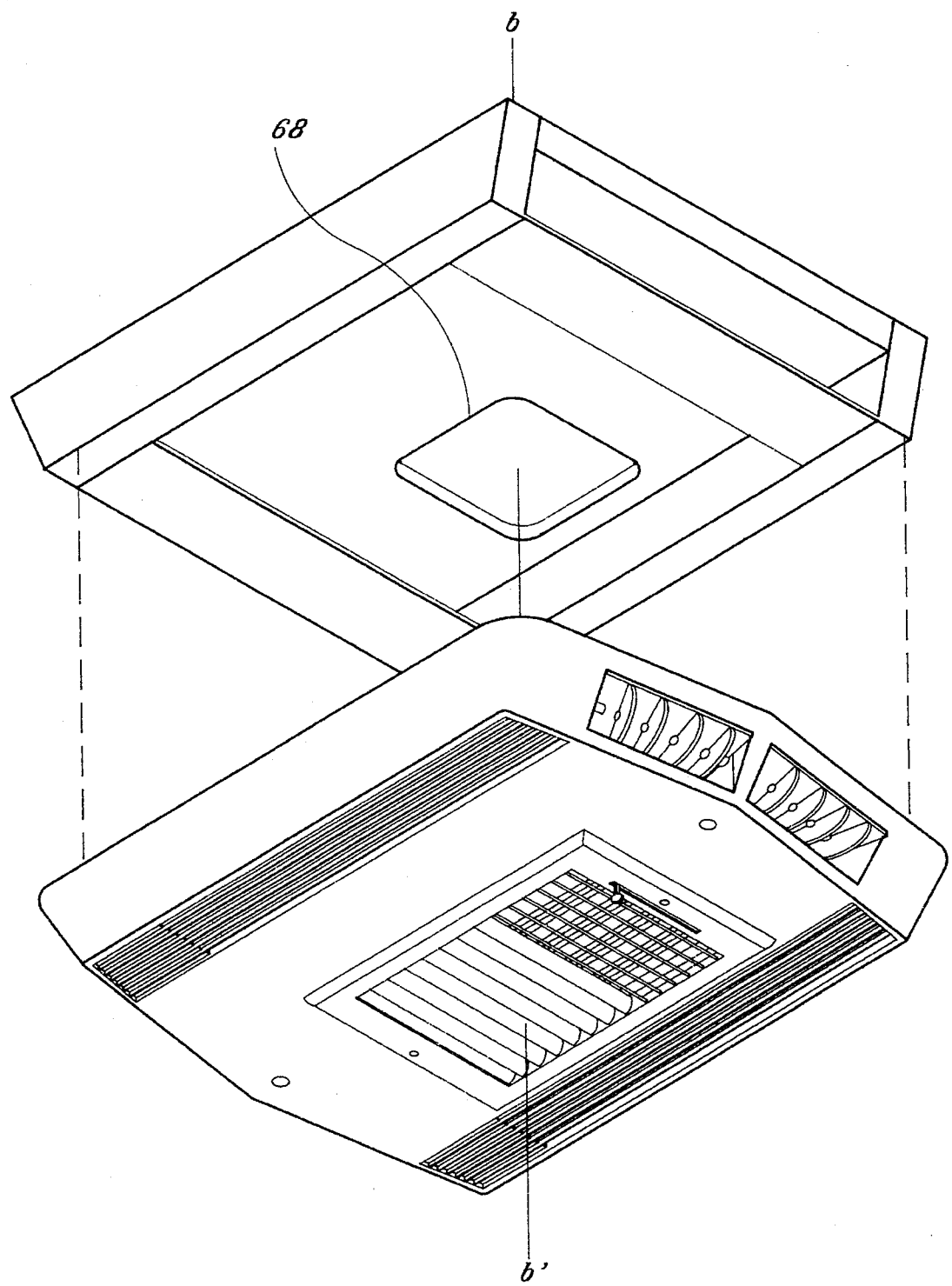
FIG. 4 is an exploded view illustrating the roof mounted air conditioner base illustrating the air conditioner blower in axial alignment with the central axis of the vertical register.

Register assembly 24 is further defined by a central axis b—b' as shown in FIG. 2, which is generally perpendicular to the top and bottom surfaces 70 and 72 of register assembly 24 and centrally passes through said surfaces. In this preferred embodiment the central axis b—b' of register 24 is aligned such that it is collinear with axis c—c' of blower 68 as shown in FIG. 4.

Figure 3:
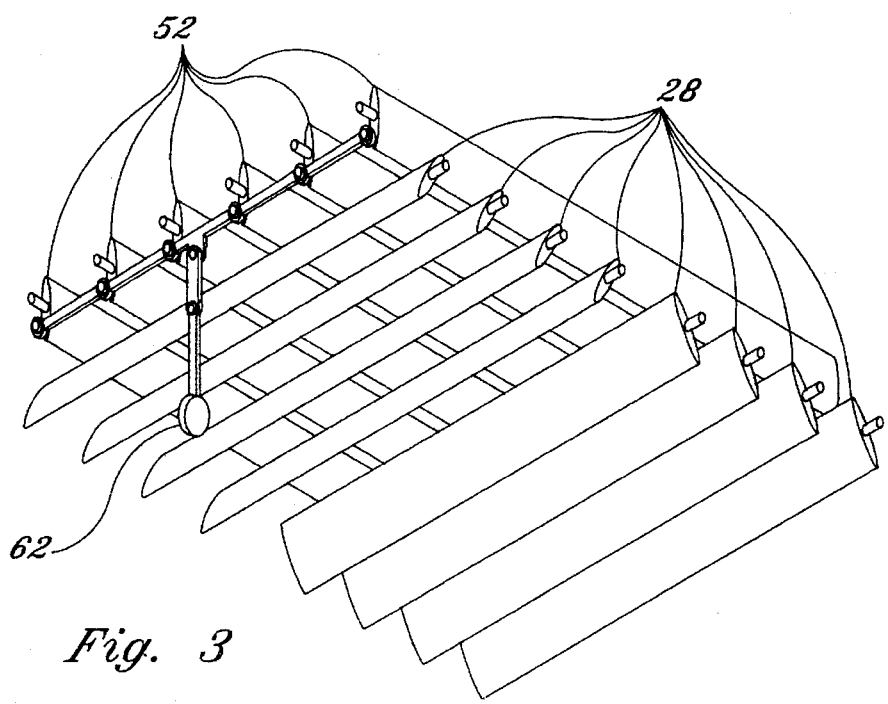
FIG. 3 is a plan view of both the volume control and direction control louvers of the present invention.

Additionally, register assembly 24 is equipped with both an air volume control means and an air direction control means. In the preferred embodiment, the volume control means comprises volume control louvers 52 and throttle 62. Volume control louvers 52 are set behind the direction control louvers 28 and operate to control the volume of air which escapes from the output blower 68 of the roof mounted air conditioner to the cooling volume. Volume control louvers 52 move between an open position and a closed position and an infinite number of positions therebetween via throttle 62. Throttle 62 controls the direction of louvers 52 between said open and closed position and is directly connected to a mechanical linkage, as shown in FIG. 3, about which the volume control louvers 52 pivot. When in an open position volume control louvers 52 are aligned generally with the flow of the air volume such that a maximum volume of air flows unrestricted and undiverted between the output blower 68 and the cooling volume. Alternatively, when in a closed position, volume control louvers 52 form a wall between output blower 68 and the cooling volume. As a result, when said volume control louvers are in the closed position, no volume of air is permitted to flow through register assembly 24 into the cooling volume.

When the volume control louvers 52 of register assembly 24 are in a closed position the output air volume of blower 68 is deflected along the inside of the cover 12 and escapes through side diffuser assemblies 18 to the cooling volume similar to conventional covers. However, side diffuser assemblies 18 allow a substantially decreased volume of air to escape into the cooling volume at a given fan setting as opposed to register assembly 24. Generally, the side diffuser assemblies 18 are exclusively used only when a minimal cooling effect is desired.

In the preferred embodiment, directional control louvers 28 are mounted generally perpendicular to, and in a plane beneath, the volume control louvers as shown in FIG. 3. Directional control louvers 28 are pivotally mounted to frame 26 and are preferably manually adjusted to deflect the volume of air passing through register assembly 24 into the cooling volume. However, a throttle means (not shown) may also be employed to adjust at least some of the directional louvers, similar to the volume control louvers. Furthermore, when louvers 28 can also be disposed in a fully closed position, to help prevent air from passing through register assembly 24 in addition to the closed position of louvers 52.

In an alternative embodiment of the present invention, register assembly 24 can be directly attached to the output lip of the blower 68 rather than cover 12. Where a short amount of duct work is used to extend the blower past other air conditioner components the register assembly 24 is sealingly mounted to the duct in alignment with the lip of the extended duct work. In this arrangement, a hole is cut in an existing cover to allow a volume of air to flow through the cover and the need for side diffuser assemblies 18 is not required. Additionally, the register assembly 24 can be further attached to the cover for the purpose of providing a more aesthetically pleasing device.

In a second alternative embodiment, register assembly 22 may be a simple grill. In this embodiment, the grill is aligned in the same manner as register assembly 22 in the preferred embodiment.

Figure 5:
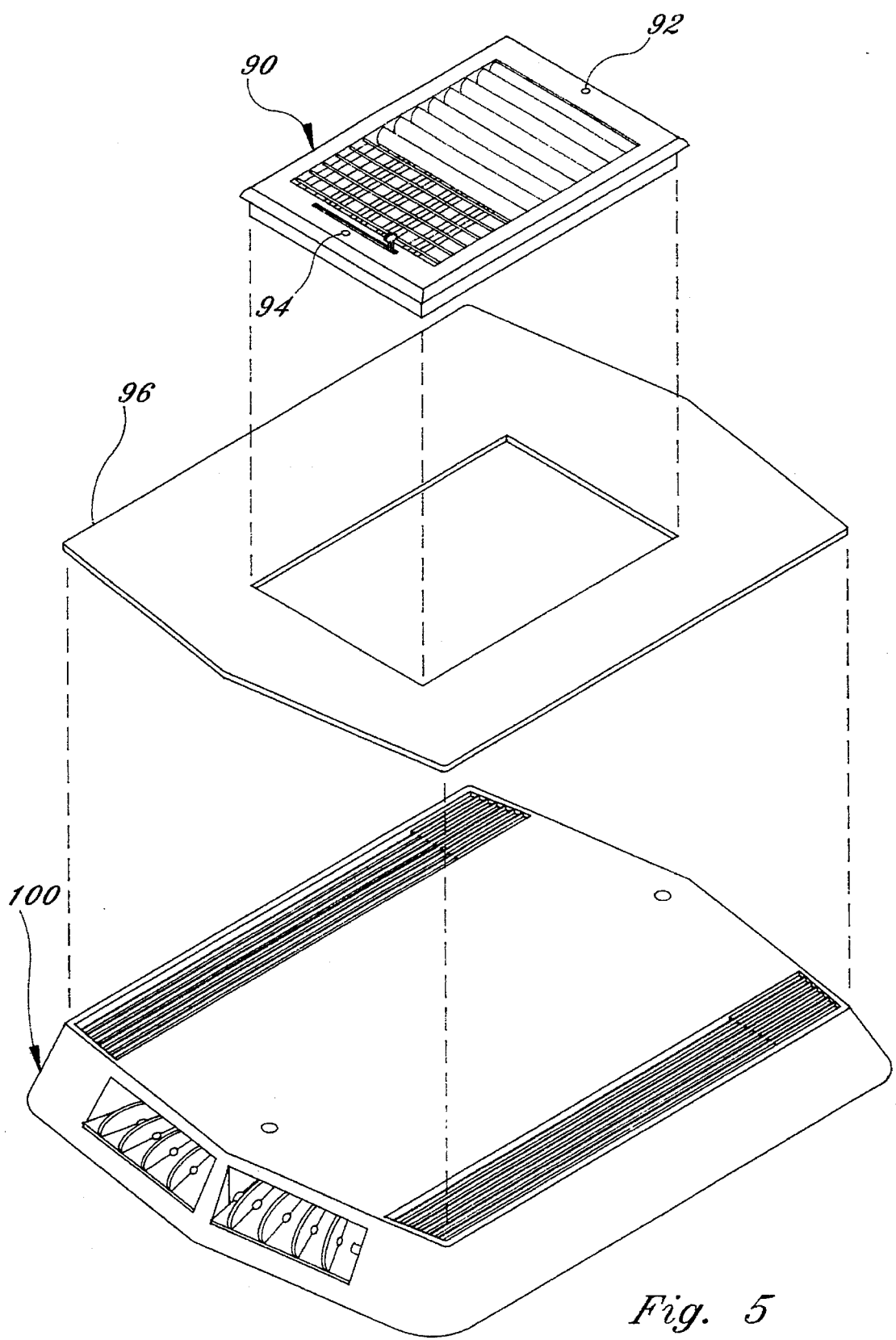
FIG. 5 is an exploded view illustrating the preferred method of the present invention.

FIG. 5, illustrates the preferred method for retrofitting existing roof mounted air conditioner's. Template 96 corresponds to one of several different conventional covers the template is specifically designed to work with. Generally, template 96 has a corresponding perimeter to the cover they are to be used on and are constructed of an inexpensive material such as cardboard and the like. Furthermore, template 96 has a cut out portion that is in line with the position the new register is to be placed.

As employed, the correct size template is selected and aligned with the edges of the existing cover assembly 100. It is recognized, however, that although templates are disclosed to determine the cut out area, they are merely a convenience and not required to retro-fit an existing cover. In that regard, any means for accurately locating the area to be cut out may be used. For example, one may manually measure the distance between the edge of the existing cover assembly 100 and the outer lip of the blower and thereby center the new register about the blower's output.

After alignment of the template, the cut out portion is traced out onto existing cover assembly 100. In turn, any means for accurately and neatly cutting through plastic is used to cut along the previously traced out shape. When the plastic has been cut and removed the new register assembly 90 supplied with the kit is inserted into the cut out hole. Finally, mounting screws 92 & 94 are used to mount the register assembly 90 to the existing cover assembly 100. Although screws are used to mount the register, other means including, glue, tape, clips, and the like can be used.

The instant invention has been shown and described herein in what is considered to be the most practical and preferred embodiments. It is recognized, however, that departures may be made therefrom within the scope of the invention and that obvious modifications will occur to a person skilled in the art.

What I claim is:

1. A cover assembly for a mounted air conditioning unit, said air conditioning unit having an output blower, said cover assembly comprising:

a cover member having a face portion and a sidewall extending around its periphery, said cover member attached to a base area of the mounted air conditioning unit;

register means for passing a volume of undiverted air from said mounted air conditioner unit through said cover member, said register means providing a first outlet means for air received from said output blower, said register means disposed within the face portion of said cover member and being substantially aligned with the output blower of said air conditioning unit when said cover member is attached to a portion of the air conditioning unit, said register means having a plurality of volume control louvers for allowing an amount of undiverted air to pass through said cover member, said volume control louvers being positioned anywhere from a fully closed position to a fully open position; and at least one side diffuser disposed within said sidewall of said cover member, said side diffuser providing a second outlet means for air received from said output blower;

wherein when said volume control louvers are in a fully closed position a volume of air received from said output blower is deflected by said register means along said cover means through said side diffuser.

2. The cover assembly of claim 1 wherein said register further defining a top surface a bottom surface and a plurality of side surfaces, said register further defined by a central axis, said central axis passing through said top and bottom surfaces of said register and substantially aligned with said output blower.

3. The cover assembly of claim 1 wherein said plurality of volume control louvers are either operated manually or by mechanical means.

4. The cover assembly of claim 3 wherein said mechanical means is a throttle operatively associated with said volume control louvers.

5. The cover assembly of claim 1 further including means for directing said volume of air.

6. The cover assembly of claim 5 wherein said means for directing is a plurality of directional control louvers.

7. The cover assembly of claim 1 further including at least one air intake grill member disposed within said face portion of said cover member, said grill member allowing said mounted air conditioning unit to receive intake air from an area which is intended to be cooled by said air conditioning unit.

8. A cover assembly for a roof mounted air conditioning unit, said air conditioning unit having an output blower, said cover assembly comprising:

a cover member having a face portion and a sidewall extending around its periphery, said cover member attached to a base area of the roof mounted air conditioning unit;

register means for passing a volume of undiverted air from said mounted air conditioner unit through said cover member, said register means providing a first outlet means for air received from said output blower, said register means disposed within the face portion of said cover member and being substantially aligned with the output blower of said air conditioning unit when said cover member is attached to a portion of the air conditioning unit, said register means having a plurality of volume control louvers for allowing an amount of undiverted air to pass through said cover member, said volume control louvers being positioned anywhere from a fully closed position to a fully open position;

at least one side diffuser disposed within said sidewall of said cover member, said side diffuser providing a second outlet means for air received from said output blower; and at least one air intake grill member disposed within said face portion of said cover member, said grill member allowing said mounted air conditioning unit to receive intake air from an area which is intended to be cooled by said air conditioning unit;

wherein when said volume control louvers are in a fully closed position a volume of air received from said output blower is deflected by said register means along said cover means through said side diffuser.

* * * * *